(12) United States Patent
Aiello et al.

(10) Patent No.: US 10,167,729 B2
(45) Date of Patent: Jan. 1, 2019

(54) KNIFE EDGE WITH INCREASED CRACK PROPAGATION LIFE

(71) Applicant: UNITED TECHNOLOGIES CORPORATION, Hartford, CT (US)

(72) Inventors: Nicholas Aiello, Middletown, CT (US); Uyen Phan, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 336 days.

(21) Appl. No.: 14/769,951

(22) PCT Filed: Feb. 12, 2014

(86) PCT No.: PCT/US2014/015950
§ 371 (c)(1),
(2) Date: Aug. 24, 2015

(87) PCT Pub. No.: WO2014/149253
PCT Pub. Date: Sep. 25, 2014

(65) Prior Publication Data
US 2016/0003076 A1 Jan. 7, 2016

Related U.S. Application Data

(60) Provisional application No. 61/789,778, filed on Mar. 15, 2013.

(51) Int. Cl.
*F01D 11/00* (2006.01)
*F01D 11/08* (2006.01)
(Continued)

(52) U.S. Cl.
CPC ............. *F01D 11/001* (2013.01); *F01D 5/20* (2013.01); *F01D 11/08* (2013.01); *F01D 11/122* (2013.01);
(Continued)

(58) Field of Classification Search
CPC ........ F01D 11/001; F01D 11/02; F01D 11/08; F01D 11/122; F01D 11/127; F01D 5/20;
(Continued)

(56) References Cited

U.S. PATENT DOCUMENTS 3,701,536 A 10/1972 Matthews et al.
3,846,899 A 11/1974 Gross
(Continued)

OTHER PUBLICATIONS

International Preliminary Report on Patentability for Application No. PCT/US2014/015950 dated Sep. 24, 2015.
(Continued)

*Primary Examiner* — Mark Laurenzi
*Assistant Examiner* — Paul Thiede
(74) *Attorney, Agent, or Firm* — Carlson, Gaskey & Olds, P.C.

(57) ABSTRACT

A knife edge seal includes a pedestal and a knife edge with a tip and a base. The base rests on the pedestal. The base has a first width and the tip has a second width, and the ratio of the first width to the second width is in the range of 5:1 to 15:1. A gas turbine engine and a method of sealing a high pressure area from a low pressure area are also disclosed.

16 Claims, 2 Drawing Sheets

(51) Int. Cl.
*F01D 11/12* (2006.01)
*F01D 11/02* (2006.01)
*F01D 5/20* (2006.01)
*F16J 15/44* (2006.01)

(52) U.S. Cl.
CPC ........... *F01D 11/127* (2013.01); *F16J 15/445* (2013.01); *F01D 11/02* (2013.01); *F05D 2220/32* (2013.01); *F05D 2240/55* (2013.01); *F05D 2250/13* (2013.01); *F05D 2250/292* (2013.01); *F05D 2300/175* (2013.01); *Y02T 50/671* (2013.01)

(58) Field of Classification Search
CPC ............. F05D 2220/32; F05D 2240/55; F05D 2250/13; F05D 2250/292; F05D 2300/175; F16J 15/445; Y02T 50/671
USPC ........................................ 415/173.1; 277/412
See application file for complete search history.

(56) References Cited

U.S. PATENT DOCUMENTS

| | | | |
|---|---|---|---|
| 5,143,383 A | 9/1992 | Meyer | |
| 5,314,304 A | 5/1994 | Wiebe | |
| 5,785,492 A | 7/1998 | Belsom et al. | |
| 6,082,738 A | 7/2000 | Peters et al. | |
| 6,308,957 B1 | 10/2001 | Wright | |
| 6,610,416 B2* | 8/2003 | Wallace | C23C 8/06 148/516 |
| 7,470,113 B2 | 12/2008 | Tran et al. | |
| 7,850,173 B2* | 12/2010 | Ivakitch | B23P 6/005 277/418 |
| 8,328,507 B2 | 12/2012 | McCaffrey | |
| 2004/0146404 A1 | 7/2004 | Chantal et al. | |
| 2005/0111967 A1 | 5/2005 | Couture et al. | |
| 2007/0297897 A1 | 12/2007 | Tran et al. | |
| 2009/0067997 A1 | 3/2009 | Wu et al. | |
| 2010/0290898 A1 | 11/2010 | McCaffrey | |
| 2011/0164963 A1 | 7/2011 | Taylor | |

OTHER PUBLICATIONS

Extended European Search Report for European Application No. 14769976.3, dated Nov. 15, 2016.
International Search Report and Written Opinion for PCT Application No. PCT/US2014/015950, dated May 28, 2014.

* cited by examiner

KNIFE EDGE WITH INCREASED CRACK PROPAGATION LIFE

BACKGROUND

This disclosure relates to a gas turbine engine component, such as a knife edge seal for a compressor or turbine rotor.

Gas turbine engines typically include a compressor section, a combustor section and a turbine section. During operation, air is pressurized in the compressor section (typically including a fan) and is mixed with fuel and burned in the combustor section to generate hot combustion gases. The hot combustion gases are communicated through the turbine section, which extracts energy from the hot combustion gases to drive the compressor section and other gas turbine engine loads.

Knife edge seals may be provided within the engine to prevent high pressure air from mixing with low pressure air and/or leaking, and improve engine efficiency. For example, knife edge seals may be present on compressor and/or turbine rotors to prevent the higher pressure gases of one stage from leaking to a lower pressure stage or location of the compressor and/or turbine section where these gases are undesired.

Knife edge seals may develop cracks which may propagate into the part to which they are integral, forcing replacement of the part. These cracks may also decrease sealing efficiency.

SUMMARY

In one exemplary embodiment, a knife edge seal includes a pedestal and a knife edge that includes a tip and a base. The base rests on the pedestal. The base has a first width and the tip has a second width. The ratio of the first width to the second width is in the range of 5:1 to 15:1.

In a further embodiment of the above, an angle between the knife edge and the pedestal is in the range of 110 to 160 degrees.

In a further embodiment of any of the above, the second width is equivalent to a width of the pedestal.

In a further embodiment of any of the above, the seal mates with a mating component.

In a further embodiment of any of the above, the mating component rotates relative to the seal.

In a further embodiment of any of the above, the mating component is stationary. The seal rotates relative to the mating component.

In a further embodiment of any of the above, the seal is comprised of a nickel-chromium alloy.

In a further embodiment of any of the above, the seal is mounted on a rotor.

In another exemplary embodiment, a gas turbine engine includes a rotor that includes one or more blades. At least one seal is configured to prevent pressurized gases from reaching a radially inner portion of the rotor. At least one seal includes a pedestal and a knife edge with a tip and a base. The base rests on the pedestal. The base has a first width and the tip has a second width. The ratio of the first width to the second width is in the range of 5:1 to 15:1.

In a further embodiment of the above, an angle between the knife edge and the pedestal is in the range of 110 to 160 degrees.

In a further embodiment of any of the above, the rotor is a turbine rotor.

In a further embodiment of any of the above, the rotor is a compressor rotor.

In a further embodiment of any of the above, the seal mates with a mating component.

In a further embodiment of any of the above, the mating component is stationary. The seal rotates relative to the mating component.

In a further embodiment of any of the above, the seal is comprised of a nickel-chromium alloy.

In another exemplary embodiment, a method of sealing a high pressure area from a low pressure area includes the step of providing a knife edge seal disposed between a high pressure area and a low pressure area. The knife edge seal has a pedestal and a knife edge with a tip and a base. The base rests on a pedestal. The base has a first width and the tip has a second width. The ratio of the first width to the second width is in the range of 5:1 to 15:1. The method provides a mating component mating with the seal.

In a further embodiment of the above, an angle between the knife edge and the pedestal is in the range of 110 to 160 degrees.

In a further embodiment of any of the above, the low pressure area is a radially inward portion of a rotor.

In a further embodiment of any of the above, the rotor is one of a turbine rotor and a compressor rotor.

In a further embodiment of any of the above, the seal is comprised of a nickel-chromium alloy.

BRIEF DESCRIPTION OF THE DRAWINGS

The disclosure can be further understood by reference to the following detailed description when considered in connection with the accompanying drawings wherein.

DETAILED DESCRIPTION

Figure 1:
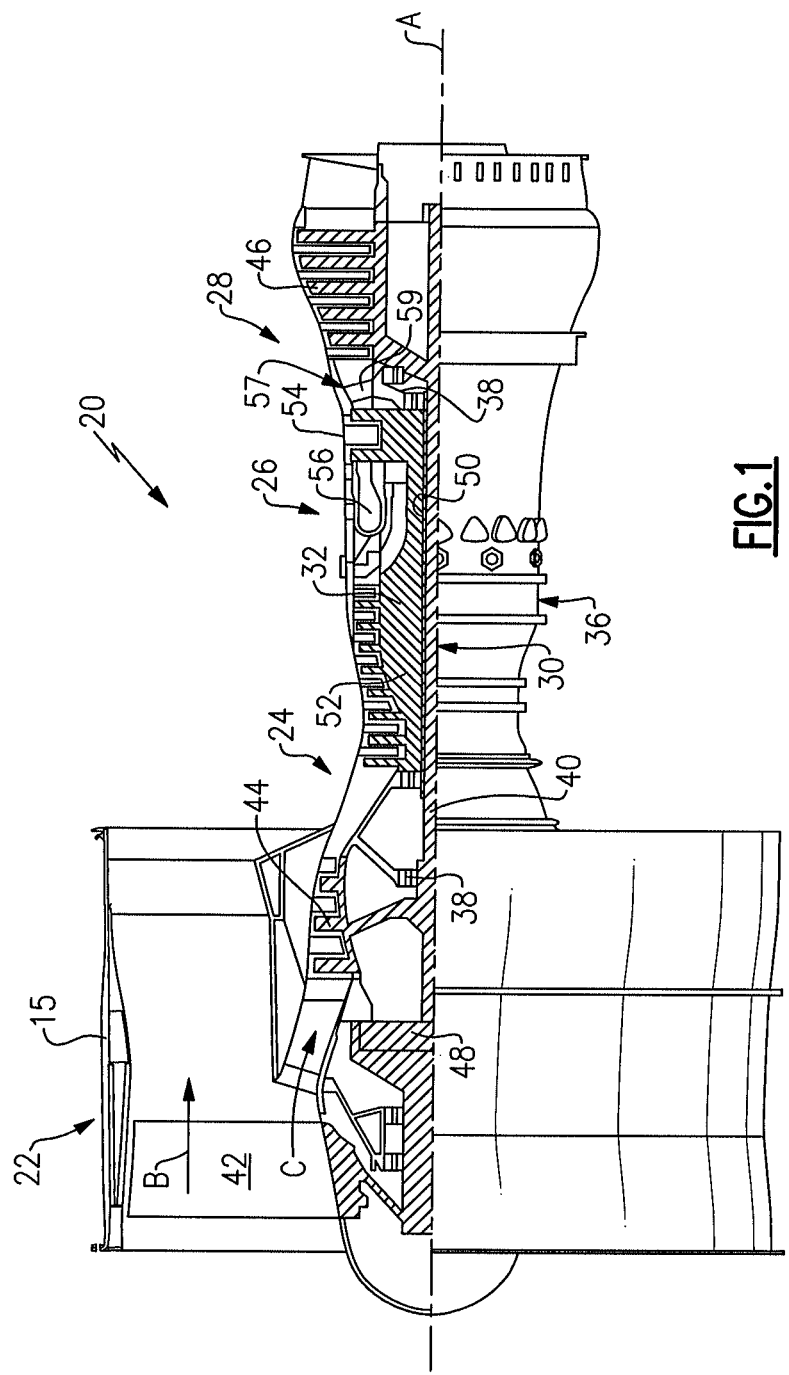
FIG. 1 schematically illustrates an example gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives a bypass flow path B which bypasses the engine core and core flow path C in a compressor section 24 where air is compressed and communicated to a combustor section 26. In the combustor section 26, air is mixed with fuel and ignited to generate a high pressure exhaust gas stream that expands through the turbine section 28 where energy is extracted to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first portion of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The fan 42 includes fan blades with tips 43. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio, for example a ratio that is greater than about five (5). The pressure ratio of the example low pressure turbine 46 is measured prior to an inlet of the low pressure turbine 46 as related to the pressure measured at the outlet of the low pressure turbine 46 prior to an exhaust nozzle.

An optional mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft. (10,668 meters), with the engine at its best fuel consumption—also known as "bucket cruise Thrust Specific Fuel Consumption ("TSFC")"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(\text{Tram }° R)/(518.7° R)]^{0.5}$. The "Low corrected fan tip speed", as disclosed herein according to one non-limiting embodiment, is less than about 1150 ft/second (350.5 meters/second).

Figure 2:
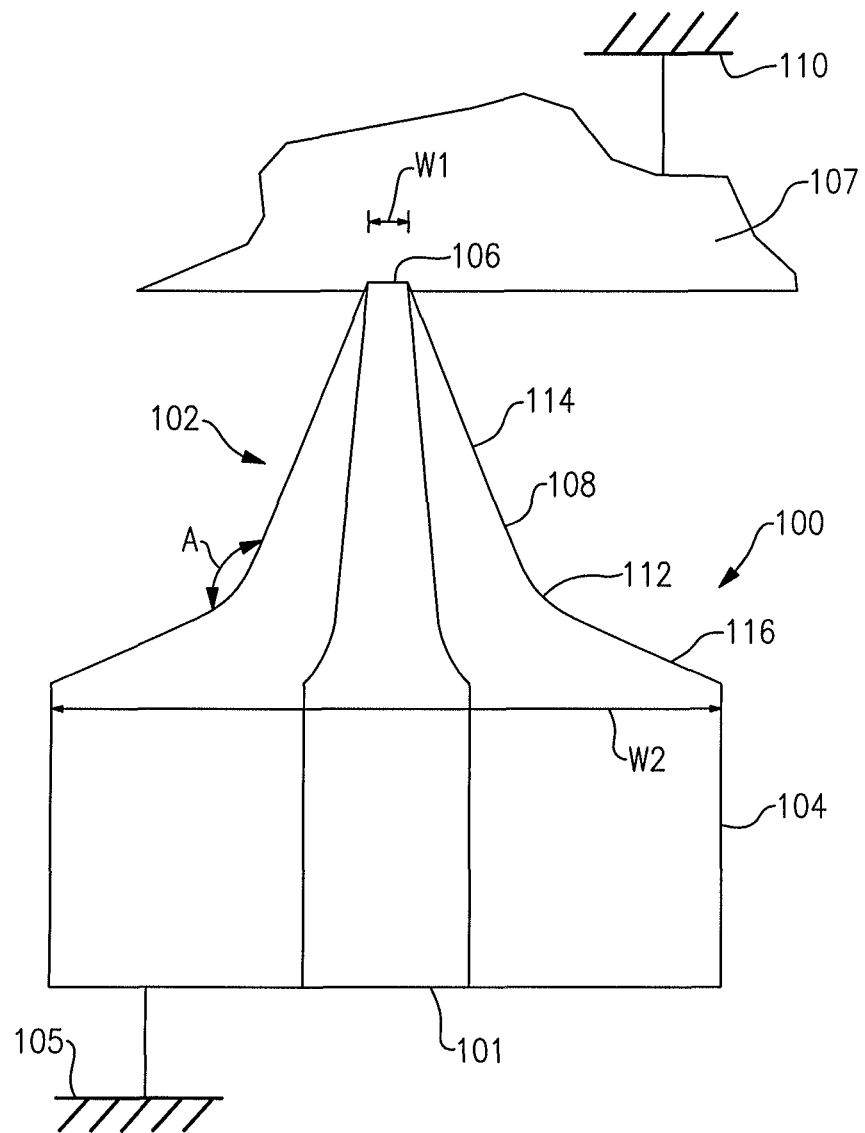
FIG. 2 schematically illustrates an example knife edge seal.

Referring to FIG. 2, a knife edge seal 100 is contrasted with a typical previous seal 101 and includes a knife edge 102 extending from a pedestal 104. The pedestal 104 is supported by a structure 105, such as a rotor. The knife edge 102 includes a tip 106 that mates with a bottom portion 108. The bottom portion 108 rests on the pedestal 104 and tapers to the tip 106. The knife edge seal 100 mates with a mating component 107. Mating component 107 may extend from a stationary or rotating structure 110, but in either case the knife edge 102 and mating component 107 rotate relative to one another.

The knife edge 102 includes a first surface 114 and the pedestal 104 includes a second surface 116. The first and second surfaces 114, 116 meet at a section 112. The tip 106 has a width W1. The bottom portion 108 has a width W2. In one example, the ratio of the widths W2:W1 is in the range of about 5:1 to 15:1.

In order to accommodate the increased ratio W2:W1 as compared to the previous seal 101, an angle A between the knife edge 102 and the pedestal 104 may be increased as compared to prior art knife edges 101. For example, the angle may be in the range of 110 to 160 degrees, although narrower angles may be used.

The additional material located away from the tip 106 in the knife edge 102 and the pedestal 104 as compared to previous knife edges 101 slows a crack that may form in the seal 100. This additional material can also act as a heat sink from the tip 106 to reduce temperature and increase the capability of the material, which may comprise a nickel-chromium alloy such as IN100 or another suitable alloy. The tip 106 remains small as compared to the previous knife edge 101 to mitigate the loss in sealing effectiveness which may be introduced with the addition of the additional material. Further, the small tip 106 is shown to be beneficial for crack propagation life, most likely due to reduced mass at the tip 106. The size of the tip 106 is limited by manufacturing capability to 0.005"-0.250" (0.13 mm-6.35 mm), Although example embodiments have been disclosed, a worker of ordinary skill in this art would recognize that certain modifications would come within the scope of the claims. For that and other reasons, the following claims should be studied to determine their true scope and content.

What is claimed is:

1. A knife edge seal having opposing sides, comprising:
   a pedestal;
   a knife edge including a tip and a bottom portion, the tip being spaced apart from the bottom portion and the bottom portion being arranged on the pedestal, the knife edge has a cross-section providing a linear first surface arranged at each of the opposing sides and extending from the tip to a radius and the pedestal has a cross-section providing a linear second surface that adjoins an outer edge surface of the pedestal, at each of the opposing sides, the linear second surface of the pedestal being in connection with the radius and downwardly and outwardly extending away in relation to the linear first surface and the radius at each of the opposing sides to adjoin with the outer edge surface, the starting location of the outer edge surface of the pedestal having an underlying, spaced relationship with the radius that is also outbound from the radius, the linear first surface and the second linear surface are arranged at each of the opposing sides so as to have a connecting, tangential relationship with the radius that adjoins the linear first surface to the linear second surface at each of the opposing sides, and the tip has a first width and the pedestal has a second width, the second width being between the outer edge surfaces at the opposing sides,
   wherein a ratio of the second width to the first width is in a range of 5:1 to 15:1, and
   wherein an angle between each of the linear first surface and the linear second surface that has the connecting, tangential relationship with the radius at each of the opposing sides is in a range of 110 to 160 degrees.

2. The knife edge seal of claim 1, wherein the second width is equivalent to a width of the pedestal.

3. The knife edge seal of claim 1, wherein the seal mates with a mating component.

4. The knife edge seal of claim 3, wherein the mating component rotates relative to the seal.

5. The knife edge seal of claim 3, wherein the mating component is stationary, and the seal rotates relative to the mating component.

6. The knife edge seal of claim 1, wherein the seal is comprised of a nickel-chromium alloy.

7. The knife edge seal of claim 1, wherein the seal is mounted on a rotor.

8. A gas turbine engine, comprising:
   a rotor including one or more blades; and
   at least one seal having opposing sides and configured to prevent pressurized gases from reaching a radially inner portion of the rotor, wherein the at least one seal includes a pedestal and a knife edge including a tip and a bottom portion, the tip being spaced apart from the bottom portion and the bottom portion being arranged on the pedestal, the knife edge has a cross-section providing a linear first surface arranged at each of the opposing sides and extending from the tip to a radius and the pedestal has a cross-section providing a linear second surface that adjoins an outer edge surface of the pedestal, at each of the opposing sides, the linear second surface of the pedestal being in connection with the radius and downwardly and outwardly extending away in relation to the linear first surface and the radius at each of the opposing sides to adjoin with the outer edge surface, the starting location of the outer edge surface of the pedestal having an underlying, spaced relationship with the radius that is also outbound from the radius, the linear first surface and the second linear surface are arranged at each of the opposing sides so as to have a connecting, tangential relationship with the radius that adjoins the linear first surface to the linear second surface at each of the opposing sides, and the tip has a first width and the pedestal has a second width, the second width being between the outer edge surfaces at the opposing sides,
   wherein a ratio of the second width to the first width is in a range of 5:1 to 15:1, and
   wherein an angle between each of the linear first surface and the linear second surface that has the connecting, tangential relationship with the radius at each of the opposing sides is in a range of 110 to 160 degrees.

9. The gas turbine engine of claim 8, wherein the rotor is a turbine rotor.

10. The gas turbine engine of claim 8, wherein the rotor is a compressor rotor.

11. The gas turbine engine of claim 8, wherein the seal mates with a mating component.

12. The gas turbine engine of claim 11, wherein the mating component is stationary, and the seal rotates relative to the mating component.

13. The knife edge seal of claim 11, wherein the seal is comprised of a nickel-chromium alloy.

14. A method of sealing a high pressure area from a low pressure area, comprising the steps of:
   providing a knife edge seal having opposing sides and disposed between a high pressure area and a low pressure area, the knife edge seal having a pedestal and a knife edge including a tip and a bottom portion, the tip being spaced apart from the bottom portion and the bottom portion being arranged on the pedestal, the knife edge has a cross-section providing a linear first surface arranged at each of the opposing sides and extending from the tip to a radius and the pedestal has a cross-section providing a linear second surface that adjoins an outer edge surface of the pedestal, at each of the opposing sides, the linear second surface of the pedestal being in connection with the radius and downwardly and outwardly extending away in relation to the linear first surface and the radius at each of the opposing sides to adjoin with the outer edge surface, the starting location of the outer edge surface of the pedestal having an underlying, spaced relationship with the radius that is also outbound from the radius, the linear first surface and the second linear surface are arranged at each of the opposing sides so as to have a connecting, tangential relationship with the radius that adjoins the linear first surface to the linear second surface at each of the opposing sides, and the tip has a first width and the pedestal has a second width, the second width being between the outer edge surfaces at the opposing sides,
   wherein a ratio of the second width to the first width is in a range of 5:1 to 15:1,
   wherein an angle between each of the linear first surface and the linear second surface that has the connecting, tangential relationship with the radius at each of the opposing sides is in a range of 110 to 160 degrees; and
   providing a mating component mating with the seal.

15. The method of claim 14, wherein the rotor is one of a turbine rotor and a compressor rotor.

16. The method of claim 14, wherein the seal is comprised of a nickel-chromium alloy.

* * * * *

UNITED STATES PATENT AND TRADEMARK OFFICE
CERTIFICATE OF CORRECTION

PATENT NO. : 10,167,729 B2
APPLICATION NO. : 14/769951
DATED : January 1, 2019
INVENTOR(S) : Nicholas Aiello and Uyen Phan Page 1 of 1

It is certified that error appears in the above-identified patent and that said Letters Patent is hereby corrected as shown below:

In the Claims

In Claim 1, Column 5, Line 22; replace "second linear" with --linear second--

In Claim 8, Column 6, Line 3; replace "second linear" with --linear second--

In Claim 14, Column 6, Line 49; replace "second linear" with --linear second--

Signed and Sealed this
Fourteenth Day of January, 2020

Andrei Iancu
*Director of the United States Patent and Trademark Office*